United States Patent [19]

Kessler

[11] E Re. 29,739

[45] Reissued Aug. 22, 1978

[54] PROCESS FOR FORMING AN ANODIC OXIDE COATING ON METALS

[75] Inventor: Saul Kessler, Canoga Park, Calif.

[73] Assignee: Joseph W. Aidlin, Los Angeles, Calif.

[21] Appl. No.: 765,451

[22] Filed: Feb. 3, 1977

Related U.S. Patent Documents

Reissue of:

[64] Patent No.: 3,996,115
Issued: Dec. 7, 1976
Appl. No.: 607,127
Filed: Aug. 25, 1975

[51] Int. Cl.[2] ..... C25D 11/34; C25D 11/26; C25D 11/30

[52] U.S. Cl. ..... 204/56 R; 204/56 M; 204/58

[58] Field of Search ..... 204/56 R, 56 M, 58

[56] References Cited

U.S. PATENT DOCUMENTS

| | | | |
|---|---|---|---|
| 2,855,351 | 10/1958 | Ernst | 204/58 |
| 3,198,672 | 8/1965 | De Hart | 204/56 R |
| 3,834,999 | 9/1974 | Hradcousky et al. | 204/56 R |

*Primary Examiner*—R. L. Andrews
*Attorney, Agent, or Firm*—Marvin E. Jacobs

[57] ABSTRACT

Efficiency of chemical surface finishing baths for metal articles, particularly electrolytic baths for anodizing metals such as aluminum, magnesium or titanium is improved by incorporating into the bath an effective amount, typically from 0.1 to 50 grams per liter of the reaction product of a metal halide, such as boron trifluoride, and a trifluoro-alkaryl amine, suitably α,α,α-trifluoro-m-toluidine.

11 Claims, 1 Drawing Figure

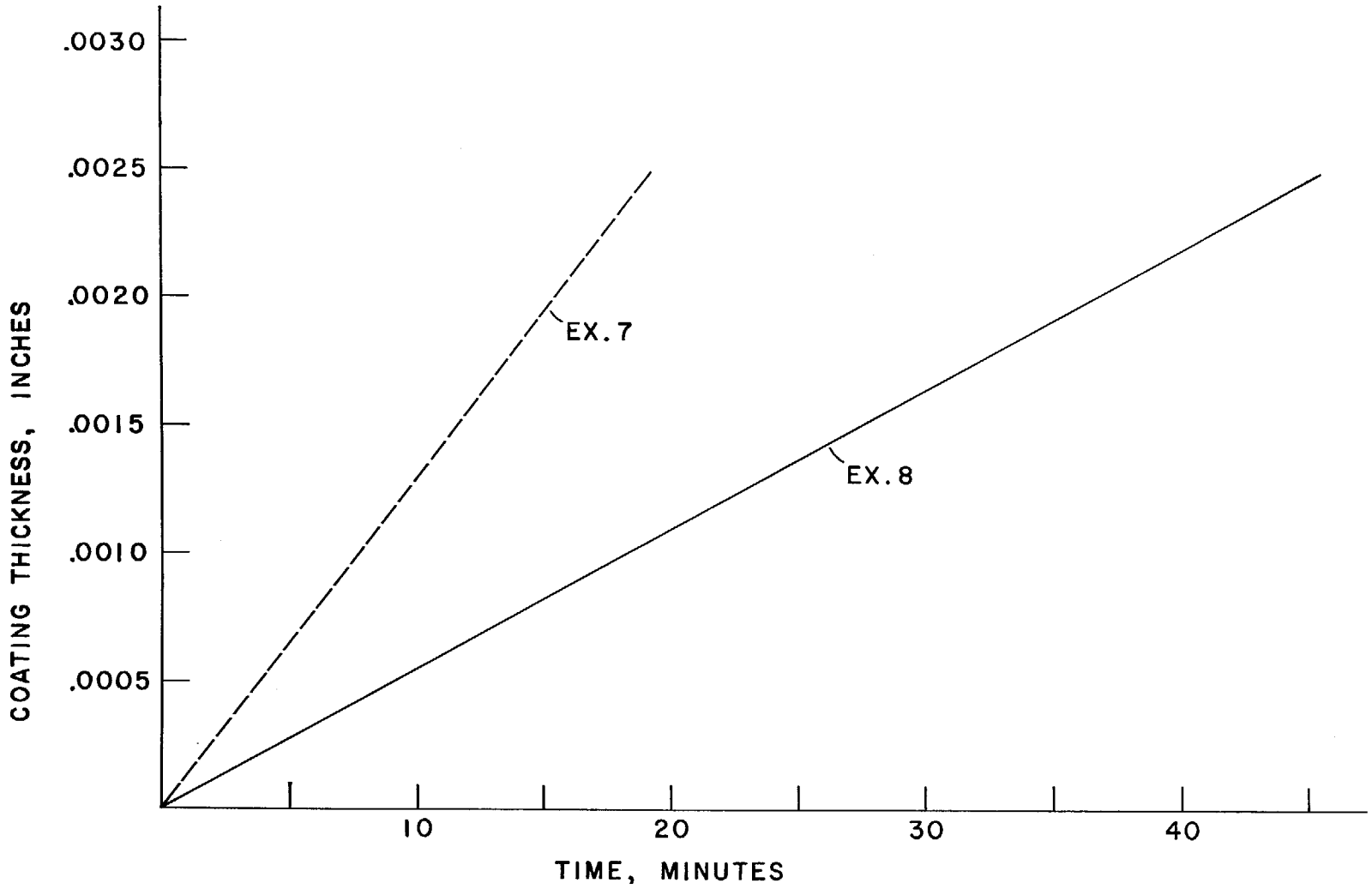
.0030
.0025
.0020
.0015
.0010
.0005
COATING THICKNESS, INCHES
10
20
30
40
TIME, MINUTES
EX. 7
EX. 8

PROCESS FOR FORMING AN ANODIC OXIDE COATING ON METALS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to chemical surface coating or etching of metals, and more particularly, to improved baths for electrolytic anodizing of metals, particularly light metals such as aluminum, magnesium or titanium.

2. Description of the Prior Art

The surface layer of metal articles are chemically converted to oxide or salt forms such as phosphate and or chromate to protect the metal from wear, corrosion or erosion or to act as an undercoating or base layer for organic finishes. Electroless chemical oxide conversion coatings are very thin and soft. While they are adequate in many cases as a protection against mild corrosion, they are normally not suitable if additionally they have to resist more severe corrosion as well as wear and abrasion. Phosphate and chromate chemical conversion coatings have the advantage of economy and speed and involve relatively simple equipment and do not require electrical power. Adequate corrosion resistance and useful paint adhesion characteristics are imparted to the surface which are entirely sufficient for many applications. These finishes are also used as temporary protective measures on aluminum articles which may require storage for an appreciable period before use.

In the case of aluminum, the chemical oxide conversion coating is thicker than the natural oxide film which forms when a freshly cut aluminum surface is exposed to the atmosphere. However, the conversion coating is still considerably thinner than the oxide films produced by anodizing and is not suitable for applications requiring hard, dense, thick coatings.

Of the numerous finishes for metals, and particularly aluminum, none are as versatile as the electrochemical oxidation and anodizing process. The dielectric aluminum oxide film produced by anodizing aluminum in boric acid solutions may be less than 1,000 A thick. In contrast, anodic coatings produced in refrigerated sulfuric acid solutions may be more than 0.005 inch (127 microns) thick. There are numerous types of anodizing electrolytes that have been employed to produce an oxide coating with useful properties. However, sulfuric acid anodizing is the most common in this country. Many millions of pounds of aluminum products for applications requiring attractive appearance, good corrosion resistance and superior wearing quality are finished by this method.

In recent years there has been a substantially increased usage of anodized aluminum in architecture and today the use of anodized curtain walls, panels, window frames and roofing materials for commercial, residential and industrial buildings accounts for a very significant part of the total area of aluminum which is treated. Since the anodic coatings for these purposes are frequently exposed to severe conditions and are often not easily accesible for adequate cleaning, substantially thick coatings must be applied and frequently it has been found more suitable to produce architectural coatings under hard anodizing conditions both in order to apply the films more rapidly and also because corrosion resistant coatings formed at low temperatures and consequently at high voltage are somewhat better.

Architectural anodic oxide coatings for external use are usually between 0.4 and 1.4 mil thick. A thin coating of about 0.1 mil may not only be ineffective but may even intensify pitting attack. The coatings are finished in a large variety of colors and surface textures, blue, gray, gold, black and silver being some of the colors most popular today for covering walls and building panels.

However, it has been found that the uniformity of color formation is not satisfactory, the finish showing gradation of color and streaking from batch to batch and within a batch. Furthermore, the density, abrasion resistance and efficiency of deposit are not totally acceptable. Since the anodizing process is a balance between the competitive dissolution and oxide formation processes, an improvement in the efficiency of coating formation would result in a saving of time, material and energy as well as decreasing the volume of waste bath to be discarded or treated to make it environmentally acceptable.

SUMMARY OF THE INVENTION

An improved bath composition for surface finishing on metal surfaces is provided by the present invention which is not subject to the disadvantages nor limitations of the previous bath compositions and provides dramatic improvement in surface properties of the coating and performance characteristics of the bath. The coating bath of the invention provides a chemically converted surface which is more dense and organized and provides significant increase in efficiency of coating deposit rate. It has further been discovered that the anodizing baths of the invention may be subjected to much higher current density without causing objectionable burning of the film. Efficiency and uniformity of dissolution are also provided in etching baths containing the additive of the invention. Colored films are found to be lustrous, bright, dense, and uniform, to have good abrasion resistance and to be very smooth. The films provide excellent cooking characteristics with foods and do not stick to fried or baked foods at cooking temperatures. The compositions of the invention will find use in finishing metal architectural panels, trim, window and door frames, cooking utensils, automotive parts, aircraft parts, marine hardware, sheets, tubes, rods and the like.

These and many other attendant advantages of the invention will become apparent as the description proceeds.

The improved chemical surface finishing bath composition in accordance with the invention comprises an aqueous vehicle containing an inorganic oxidant-etchant and an effective amount of the reaction product of a metal halide and a polyhalo-substituted alkarylamine. The metal surfaces are processed in a manner conventional in the art, suitably are preliminary cleaning treatment and surface brightening or roughening, if desired for special effect. The part is immersed in the bath and is maintained in the bath until the desired thickness and quality of coating or etching has been effected. The article is then removed and subjected to conventional after-treatment such as sealing, waxing or dyeing and is then ready for service.

The invention will now become better understood by reference to the following detailed description when considered in conjunction with the accompanying drawing.

BRIEF DESCRIPTION OF THE DRAWINGS

The FIGURE is a graph demonstrating the improved anodizing rate of the anodizing bath of the invention compared to a prior art bath absent the additive of the invention.

DESCRIPTION OF THE PREFERRED EMBODIMENTS

The detailed description which follows relates to the treatment of aluminum surfaces, one of the most widely treated metals, but, obviously, the treatment is applicable to other metals, the surfaces of which are converted to a passivated metal salt layer more resistant to corrosion than the untreated metal surfaces such as of titanium, magnesium, copper, iron or alloys thereof such as stainless steel. The additive of the invention is generally present in the bath and in an amount from 0.1 to 50, preferably 1 to 20 grams per liter and is formed from a combination of ingredients which react to form a fluoro, chloro, bromo or iodo substituted hydrocarbon aminemetal halide complex capable of improving deposition rate and coating characteristics. While not desiring to be bound by theory it is believed that the additive of the invention causes an organization of the layer that forms which permits the metal oxide or salt molecules to organize in a faster manner and to form a more organized, denser deposit providing a harder, smoother, denser, more abrasion and corrosion resistant deposit having more even color.

The first ingredient utilized in forming the additive material is an at least trihalogenated compound of fluorine, bromine, iodine or chlorine, and a metal, particularly Group 1b, 2, 3a, 4b, 5b, 6b and 8 metals such as copper, magnesium, boron, aluminum, titanium, vanadium, niobium, chromium and tungsten. A preferred material is boron trifluoride and especially in a stabilized form as a complex with a lower alkyl ether such as diethyl ether.

The other necessary ingredient is an alkarylamine, particularly a fluorinated alkarylamine having a relatively high content of available and active fluorine atoms which is reactive with the metal halide. Preferred materials are fluoroalkylaryl compounds selected from those of the formula:

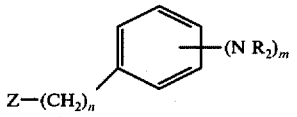

where n is an integer from [1] *0* to 4, m is an integer from 1–2 and R is selected from hydrogen, lower alkyl of 1–9 carbon atoms, lower alkanol of 1–8 carbon atoms and aryl such as phenyl or aralkyl such as benzyl and Z is [hydrogen or] $—CX_3$ where X is fluoro, chloro, bromo, *or* iodo [or R]. A suitable material is α,α,α-trifluoro-m-toluidine. The presence of an amino group is believed to relieve stress in the deposited film in a manner analogous to the action exhibited by sulfonamides in electrodeposition or anodizing of aluminum.

The metal halide and fluorinated hydrocarbon can be reacted in bulk, in solution or suspension in a fluid in liquid or gas phase.

The reaction is preferably carried out in an organic liquid diluent or solvent, preferably having a boiling point above 100° C. Higher molecular weight products are formed in the liquid carrier and a suspension is formed which can readily be applied to the surface to be treated.

Suitable diluents are polychloro substituted aliphatic compounds such as trichloroethylene, carbon tetrachloride, tetrachloroethylene, difluoro-dichloro-ethylene, fluorotrichloroethylene or other terminally halogenated alkenes of 2–8 carbon atoms. For purposes of reactivity during forming the coating material and for inertness and temperature resistance of the material, the compound is preferably substituted with chlorine on the carbon atoms adjacent the unsaturation, such as tetrachloroethylene.

The ratio of the ingredients can be varied within wide limits depending on the hardness and other desired characteristics of the film and the economics of maximizing yield. Since the diluent, such as tetrachloroethylene, is readily available at low cost, it can predominate in the reaction mixture. Satisfactory yields are obtained by including minor amounts of from 1–20 parts and preferably about 2–5 parts by volume of the other ingredients. Though the order of addition is not critical, it is preferable to first form a mixture of the diluent and fluorinated hydrocarbon before adding the metal halide.

A specific example follows:

EXAMPLE 1

An additive was prepared from the following ingredients:

| Component | Amount |
|---|---|
| Tetrachloroethylene $Cl_2C{=}CCl_2$ | 900–960 ml |
| Boron trifluoride etherate $(C_2H_5)_2O \cdot BF_3$ | 50–20 ml |
| α,α,α,-trifluoro-m-toluidine $(C_7H_6F_3N)$ | 50–20 ml |

The toluidine and tetrachloroethylene were combined and a cloudy suspension was formed. When the metal halide etherate was added, globules of a fluffy, waxlike, white precipitate was observed in copious volume after storage at room temperature. A maximum volume of waxlike solid of over ½ the initial volume of the mixture was obtained after several days. The waxlike solid was separated by filtration and washed with methanol and water.

The reaction could be accelerated by heating the mixture to a higher temperature. The waxlike material was heated to 575° F and no decomposition or melting of the material was observed. Since the formation of a waxy solid is observed, a chloro-fluoro-boro substituted hydrocarbon polymer is believed to be formed.

EXAMPLE 2

Trichloroethylene was substituted for the tetrachloroethylene of Example 1. A fluffy, waxlike, gelatinous, lightly colored reaction product was formed.

EXAMPLE 3

Carbon tetrachloride was substituted for the tetrachloroethylene of Example 1. A product similar to that of Example 2 was formed.

EXAMPLE 4

When the tetrachloroethylene was eliminated, a more vigorous and exothermic reaction occurred and a more solid reaction product was recovered.

EXAMPLE 5

An equivalent amount of $BBr_3$ liquid was substituted for the $BF_3$ etherate of Example 1. The yield was almost doubled, the reaction product was more soluble in organic solvent and the suspension in the liquid carrier was more uniform and stable.

EXAMPLE 6

An equal amount by weight of $BI_3$ crystals were substituted for the $BF_3$ etherate of Example 1. The reaction product was less soluble in organic solvent and separated out as individual hard particles in lower yield. The product was more soluble in water.

In the known processes of anodizing metals such as aluminum, the metal body is placed in a bath of suitable electrolyte and connected as an anode in a direct current electrical circuit which includes the electrolyte bath. When current is passed through the bath, an oxide layer is formed on the surface of the aluminum body that is characterized by being thicker than an oxide that would form in air. Bath composition, temperature and electrical parameters are well known to those skilled in the art and are the subject of industrial and military specifications. The choice of bath, concentration thereof, time and temperature parameters, depend on the alloy being treated and the porosity, density and color of coating desired. The temperature may be staged as in the Sanford process as described in U.S. Pat. No. 2,977,294 and the electrolyte may be mixed such as in the Kalcolor process containing sulphosalicyclic acid mixed with sulfuric acid or sulphate. Sulfuric-mellitic acid baths are utilized in the Sanford process permitting the use of higher anodizing conditions, and it is often possible to produce a desired color without dyeing by the correct choice of alloy. For instance, a 3 mil coating has an acceptable black color on aluminum-silicon alloys while copper-rich alloys produce a bronze film under the same anodizing conditions.

Hard anodizing typically involves cooling the sulfuric acid electrolyte to slow down the rate of dissolution of the oxide. Coatings up to 10 mils can be obtained with a loss of metal about 3 grams per square foot providing coatings giving excellent wear resistance and heat and electrical insulation.

The limiting film thickness is reached when the rate of chemical dissolution of the film in the electrolyte is equal to the rate of film growth. The limiting thickness can be increased by lowering the temperature, acid concentration or voltage, or by increasing current density. Of the alternatives, both decreasing acid concentration and increasing current density require an increase in voltage, thus leading to a local rise in temperature of the anode. Cooling the solution is the principal cause of the production of thick coatings, and at higher current densities the coatings that are formed will be hard.

Commercial hard anodizing processes can utilize direct current or superimposed A.C. on D.C. and the voltage may be maintained constant or increased. A well known D.C. process utilizes a 15% sulfuric acid electrolyte operated at 20 to 25 amps per square foot and 0° C. To maintain this current density the initial voltage of 25 to 30 volts is increased to 40 to 60 volts. This process is particularly suitable for the production of thick coatings of 5 mils or more. Where thinner films are required it is possible to work at higher temperatures. Agitation is important in many of the low temperature processes operated at high currents and voltages.

The following table provides typical conditions for practicing anodizing aluminum in accordance with the invention.

Table I

| Ingredient | Range |
|---|---|
| $H_2SO_4$ (93%) | 5–400 g/l |
| Boro-fluoroamine additive | 0.5 to 20 g/l |
| Current density | 5–200 amps/dm$^2$ |
| Temperature | −20° C to 100° C |
| Time | 2–120 minutes |

EXAMPLE 7

A 1 liter bath containing 185 grams per liter of 93% $H_2SO_4$ was formed containing 1.2 grams per liter of the additive of Example 1. The bath was contained in a stainless steel tank which was connected as cathode and a flat 1 inch square specimen of aluminum 3003-H14 alloy was connected as anode and inserted into the bath. The bath temperature was adjusted to 0° C and after 15 minutes at 100 amps/dm$^2$, a thick, uniform, dense, hard coating of anodic aluminum oxide was formed on the specimen. The additive of the invention causes at least a 40% increase in deposition rate as well as permitting much higher current densities without deterioration of the film.

EXAMPLE 8

The procedure of Example 7 was repeated on the same alloy specimen under the same conditions except that the additive was not present in the bath. As can be seen in the FIGURE, the deposition thickness for equivalent times was only 60% of that achieved for the bath composition of Example 7. Furthermore, the coating was not as organized nor as dense. The color on the specimens treated according to Example 8 was less uniform than that achieved on the specimen treated according to Example 7.

The chemical composition of aluminum alloy 3003 H14 is as shown in the following table:

Table II

| Ingredients | Weight, % |
|---|---|
| Mn | 1.0–1.5% |
| Fe | 0.7% maximum |
| Si | 0.6% maximum |
| Cu | 0.20% maximum |
| Zn | 0.10% maximum |
| Al | Remainder |

The hardness of the anodic deposits of Example 7 and 8 was compared by the conventional commercial scratch test which indicated that the anodic aluminum oxide deposit on the specimen of Example 7 was significantly harder than the deposit on the specimen of Example 8.

As previously discussed, the additive of the invention also provides improvement in the coating rate and coating characteristics of chemical conversion coatings. Again there are numerous bath compositions and coating techniques well known in the art.

Typical aluminum oxide baths contain an oxidizing agent and a basic salt in an amount from 5 to 50 grams per liter and are operated at 20° to 100° C for 1 minute to 2 hours. A typical bath solution contains sodium carbonate and sodium chromate in a ratio of approximately 3 to 1. Another similar bath widely used in this country consists of potassium carbonate and sodium dichromate. After treatment the coating is sealed in a potassium dichromate solution. Other chemical oxidization processes are based on sodium fluosilicate, oxalate or fluozirconate in combination with a sodium or ammonium nitrate and a nickel or cobalt salt.

Chemical conversion coatings utilized for preparing a surface for undercoating or painting also proceed by forming a chromate-phosphate salt on the surface. This treatment makes use of an acid solution containing chromates, phosphates and fluorides, optimally containing 20 to 100 grams per liter of phosphate ion, 2 to 6 grams per liter of fluoride ion, and 6 to 20 grams per liter chromate ion, with the ratio of fluoride to chromate acid lying between 0.18 and 0.36. Aluminum surfaces are also treated with a similar chromate conversion coating based on a mixture of chromate and fluoride ions and there is a chromate-protein process in which corrosion resistant coatings of the hardness of enamel are produced which is applicable not only to aluminum but also to steel, zinc and brass and employs a solution containing chromate acid or dichromate, formaldehyde and a protein such as gelatine, casein, or albumin.

Chemical conversion coatings are usually provided to a depth of at least 0.10 mil to provide a softer microporous, more inert and chemically stable and corrosion resistant surface than the untreated surface. Many times conversion coated surfaces exhibit uniformly pleasing color. Usually such surfaces are not treated to a depth of over 1 mil. No dimensional growth or change is usually achieved by this treatment but simply formation of a chemically-converted, thin, microporous zone extending inward from the original surface to a penetration depth of about 0.5 mil.

The conversion coating solutions for titanium generally contain a mixed salt complex formed from Group I or Group II metal salt of a reactive anion such as phosphate, borate or chromate; a Group I or Group II metal halide and an acid, typically a hydroallic acid. Typically bath compositions and conditions for treating titanium are presented in the following table.

Table III

| Bath | Bath Composition Grams per liter | Temperature ° F | pH | Immersion Time, min |
|---|---|---|---|---|
| 1 | 50 $Na_3PO_4 \cdot 12H_2O$<br>20 $KF \cdot 2H_2O$<br>11.5 HF solution | 185 | 5.1 to 5.2 | 10 |
| 2 | 50 $Na_3PO_4 \cdot 12H_2O$<br>20 $KF \cdot 2H_2O$<br>26 HF solution | 80 | 1.0 | 1 to 2 |
| 3 | 40 $Na_2B_4O_7 \cdot 10H_2O$<br>18 $KF \cdot 2H_2O$<br>16 HF solution | 185 | 6.3 to 6.6 | 20 |

EXAMPLE 9

Sufficient deionized water was added in each case to adjust the volume to 1 liter and then 1.2 grams per liter of the additive of Example 1 was added to the solution. The HF solution was a commercial 50.3 weight percent solution. A thicker more uniform deposit was provided as compared to titanium articles subjected to the same compositions and conditions absent the additive of the invention.

The etchant, conversion, and electrolytic anodic compositions of the invention containing the additive as described herein will provide greater efficiency, conserve utilization of energy, eliminate the volume of waste bath products, and provide harder, denser, more organized and evenly colored films on the surfaces of metal articles. The composition of the invention will be useful in whatever applications of aluminum, magnesium, titanium, copper, iron and other metals requiring abrasion resistance, corrosion resistance, hardness, lubricity, bright and even color, and other such attributes.

It is to be realized that only preferred embodiments of the invention have been described and numerous substitutions, modifications and moderations are permissable without departing from the spirit and scope of the invention as defined in the following claims.

What is claimed is:

1. A method of depositing an electrolytic anodic oxide layer on the surface of a metal article capable of being converted to a passivated metal salt layer comprising the steps of:

applying to the surface of the article an aqueous anodizing electrolyte containing an effective amount of oxidant capable of forming an anodic oxide on the metal surface and 0.1 to 50 g/l of an additive comprising the reaction product of (a) a halogenated compound of fluorine, chlorine, iodine or bromine and an inorganic cation selected from Groups 1b, 2, 3a, 4b, 5b, 6b or 8 and (b) an alkarylamine of the formula:

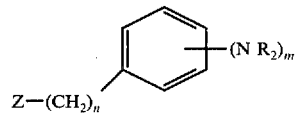

where n is an integer from [1] *0* to 4, m is an integer from 1–2 and R is selected from hydrogen, lower alkyl of 1–9 carbon atoms, lower alkanol of 1–8 carbon atoms, aryl or aralkyl and Z is [hydrogen or] $CX_3$ where X is fluoro, chloro, bromo, *or* iodo [or R]:

making the article the anode in the electrolyte;

applying a current density between 5 to 200 amps/dm$^2$; and depositing an anodic oxide layer on said surface.

2. A method according to claim 1 in which the inorganic cation is selected from copper, magnesium, boron, aluminum, chromium or tungsten.

3. A method according to claim 2 in which the halogenated compound and amine are present in the additive in an amount from 1 to 20 parts by volume of amine to 1–20 parts by volume of compound.

4. A method according to claim 2 in which the trihalogenated compound is boron trifluoride etherate.

5. A method according to claim 4 in which the amine is a fluoro-alkarylamine.

6. A method according to claim 5 in which the fluoroalkarylamine is α,α,α-trifluoro-m-toluidine.

7. A method according to claim 4 in which the amine and compound are present in the additive in an amount from 2 to 5 parts of amine by volume to 2 to 5 parts of compound by volume.

8. A method according to claim 1 in which the metal article being treated comprises a metal selected from aluminum, titanium, magnesium, copper, iron or alloys thereof.

9. A method according to claim 8 in which the metal article comprises aluminum and the oxidant is an electrolytic aluminum anodizing electrolyte.

10. A method according to claim 9 further including the steps of cooling the bath to a temperature from −20° C to 20° C.

11. A method according to claim 10 in which the electrolyte is sulfuric acid present in an amount from 5 to 400 grams per liter, the additive is present in an amount from 0.1 to 20 grams per liter, and the current density applied to the bath is from 5 to 200 amps/$dm^2$.

* * * * *